(12) United States Patent
Helms et al.

(10) Patent No.: US 8,314,559 B1
(45) Date of Patent: Nov. 20, 2012

(54) LED HEADLAMP WITH A HEATED COVER

(75) Inventors: James M. Helms, Fort Myers, FL (US); John-Kevin Trumbetas, Pittsburgh, PA (US); John A. Lowrey, III, Saxonburg, PA (US); Mark R. Barie, Glenshaw, PA (US); Richard P. Lizotte, Hudson, NH (US)

(73) Assignee: Ibis Tek, LLC, Butler, PA (US)

( * ) Notice: Subject to any disclaimer, the term of this patent is extended or adjusted under 35 U.S.C. 154(b) by 345 days.

(21) Appl. No.: 12/803,008

(22) Filed: Jun. 17, 2010

Related U.S. Application Data

(60) Provisional application No. 61/275,011, filed on Aug. 24, 2009.

(51) Int. Cl.
    *B60Q 1/00* (2006.01)

(52) U.S. Cl. .......................................... 315/82; 362/546

(58) Field of Classification Search ................ 362/459, 362/546, 547, 549, 548, 362, 373; 315/82, 315/77, 78, 83
See application file for complete search history.

(56) References Cited

U.S. PATENT DOCUMENTS

| | | | | |
|---|---|---|---|---|
| 6,558,026 | B2 * | 5/2003 | Strazzanti | 362/464 |
| 6,595,672 | B2 * | 7/2003 | Yamaguchi | 362/547 |
| 2002/0195947 | A1 * | 12/2002 | Doczy et al. | 315/77 |
| 2010/0067248 | A1 * | 3/2010 | Frey et al. | 362/538 |

* cited by examiner

*Primary Examiner* — David Hung Vu
(74) *Attorney, Agent, or Firm* — Karen Tang-Wai Sodini

(57) ABSTRACT

A vehicle headlamp using a high-power LED light source, receiving power regulated by a driver circuit, is mounted in a housing and covered at least in part by a light transmissive cover using a construction by which heat developed by the driver circuit (current regulator) is conducted to the light transmissive cover, thereby heating the transparent cover and so retarding the formation or accumulation of ice and snow on the light transmissive cover.

5 Claims, 3 Drawing Sheets

LED HEADLAMP WITH A HEATED COVER

CROSS REFERENCE TO RELATED APPLICATION

Reference is made to and priority claimed from U.S. provisional application Ser. No. 61/275,011, filed Aug. 24, 2009.

FIELD OF THE INVENTION

The present invention pertains to the field of lighting or illumination. More particularly, the present invention pertains to the field of vehicle headlamps using LEDs as a light source.

BACKGROUND OF THE INVENTION

An inherent problem using visible-light light-emitting diodes (LEDs) as light sources in a vehicle headlamp is that, unlike incandescent or halogen lights, such (visible-light) LEDs, sometimes called "cool-beam" lights, do not produce significant light in the infrared, or at least not enough to cause any cover (plastic or glass, lens or merely protective) to warm up when the light is turned on and passes through the cover, but such warming is necessary to keep ice or snow from forming on the headlamp cover while the vehicle is being operated. LEDs, however, are becoming an increasingly popular alternative to "warm-beam" light sources largely because of efficiency, but also because they offer more flexibility in design.

What is needed, therefore, is an LED headlamp according to a design that provides heat to the headlamp cover, in sufficient amount to keep snow or ice from forming on the headlamp cover while the vehicle is in operation.

SUMMARY OF THE INVENTION

Accordingly, for a headlamp using an LED as a light source disposed behind a plastic or glass cover, and using an LED driver circuit to regulate power provided to the LED, the present invention provides thermally conductive interfaces between the LED driver circuit and the cover and locates the LED driver circuit advantageously for heat transfer from the LED driver circuit to the cover, thereby conducting heat from the LED driver circuit to the cover, in order to heat the cover so as to help keep the cover free of ice and snow. A typical application of the invention also uses heat conducted to the cover from the LED itself.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
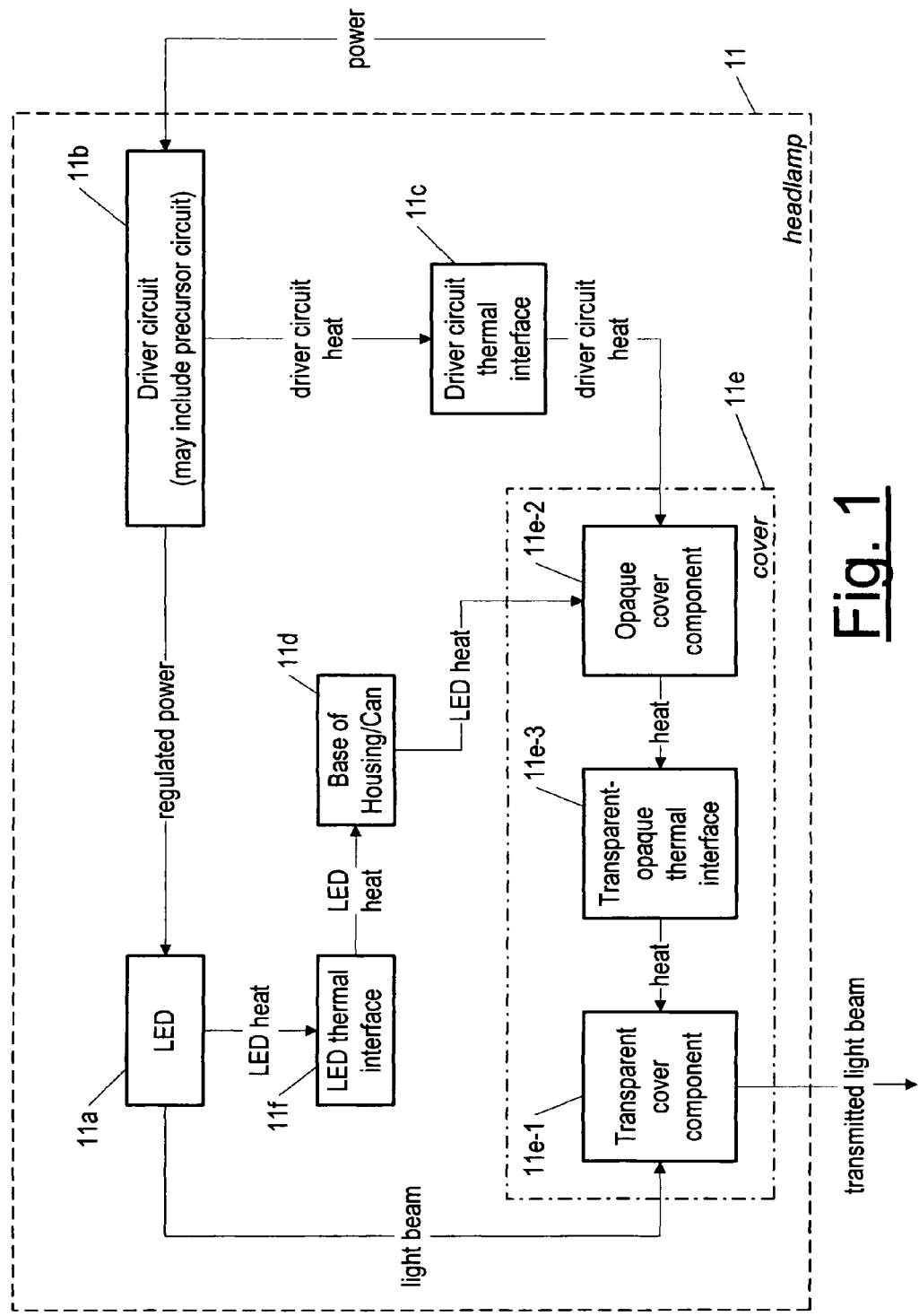
FIG. 1 is a block/flow diagram of a headlamp according to an embodiment of the invention.

The following is a list of reference labels used in the drawings to label components of different embodiments of the invention, and the names of the indicated components.
11 vehicle headlamp
11a light-emitting diode (LED) light source
11b driver circuit
11c driver circuit thermal interface
11d base
11e cover
11e-1 transparent cover component
11e-2 opaque portion (of cover)
11e-3 transparent-opaque thermal interface
11f LED thermal interface
11g reflector
12 processor
14 temperature sensor

DETAILED DESCRIPTION

Figure 2:
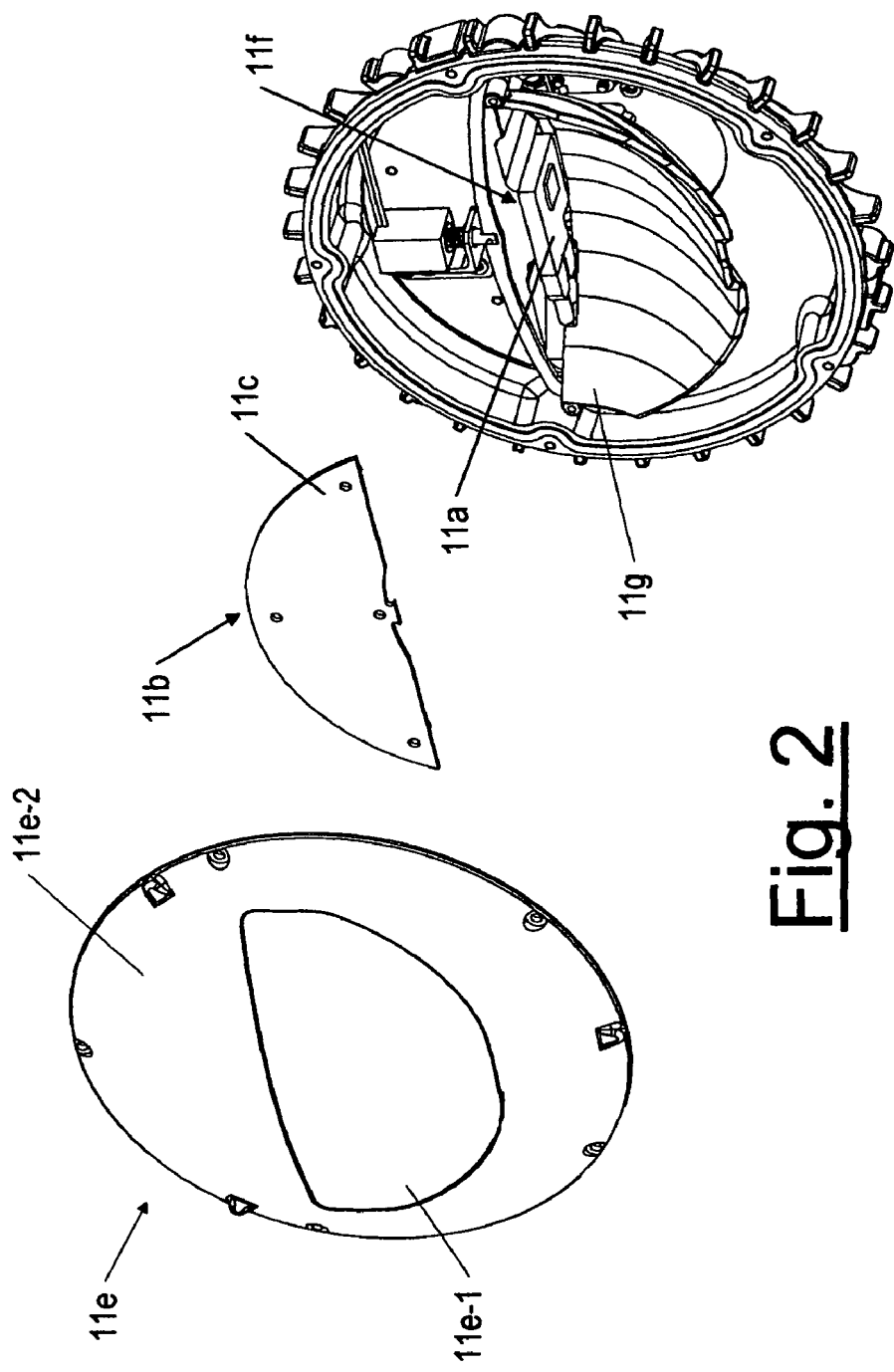
FIG. 2 is a perspective drawing of a headlamp according to an embodiment of the invention indicated by FIG. 1.
Figure 3:
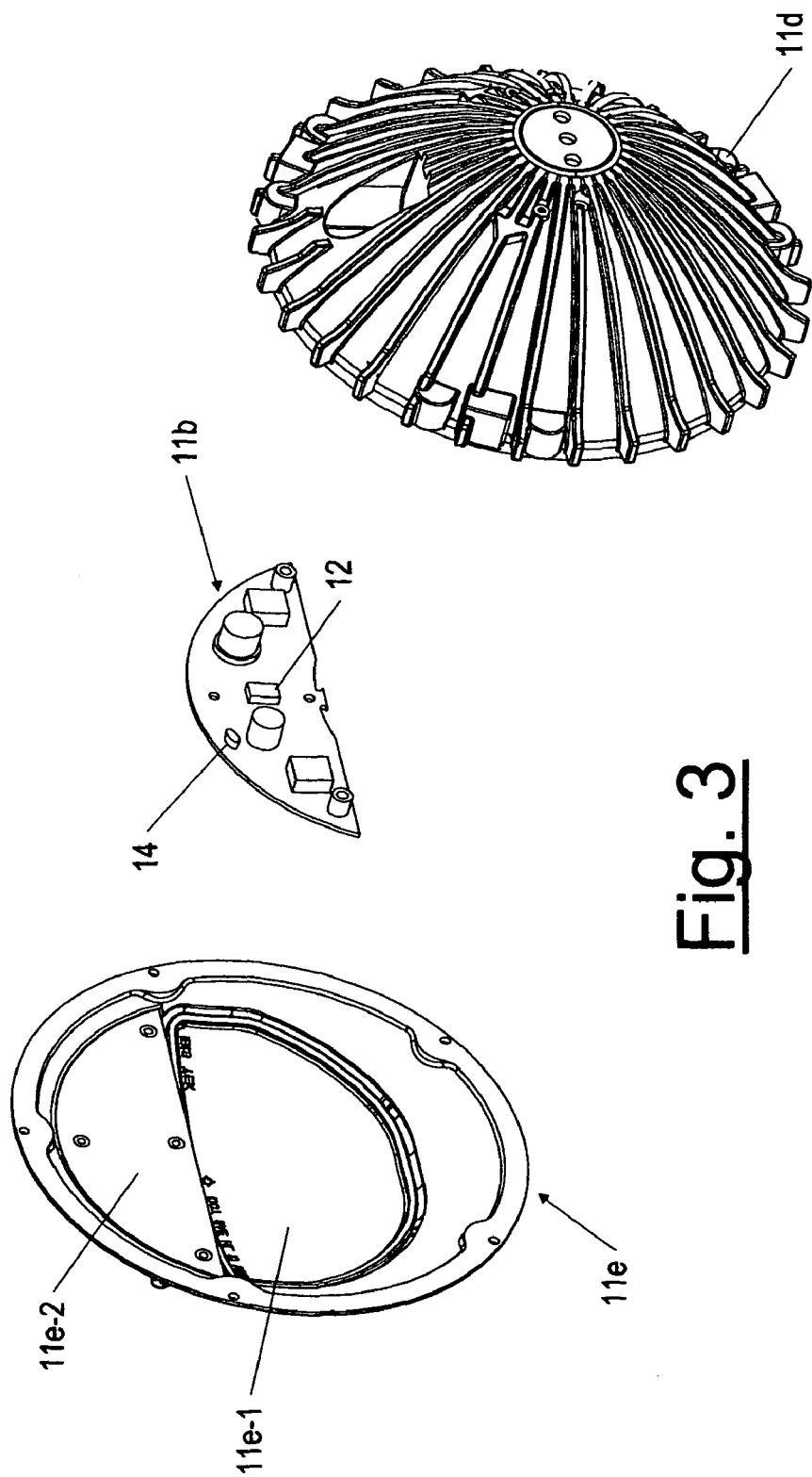
FIG. 3 is a perspective drawing of the headlamp in FIGS. 1 and 2, showing the opposite side of the printed circuit board and the driver components provided by the invention.

Referring now to FIGS. 1 to 3, a vehicle headlamp 11, according to one embodiment of the present invention, includes an LED light source 11a and a driver circuit 11b for providing regulated power to the light source using power from a power source (not shown), such as the vehicle battery. The components of the driver circuit are typically provided on a printed circuit board made, advantageously, of thermally conductive material. FIGS. 2 and 3 show opposite sides of the printed circuit board, FIG. 3 showing the side on which the components of the driver circuit board are provided.

The LED light source 11a and driver circuit 11b are attached to, and enclosed within a housing (sometimes called a "can"), including a generally concave or bulbous (and typically-bowl-shaped) base 11d and a cover 11e that includes a transparent cover component 11e-1 and a non-transparent or opaque portion 11e-2. The term "transparent" used here means light transmissive, and encompasses both a merely protective light transmissive cover of glass or plastic without any lens properties as well as a lens for shaping light into a desired beam pattern. The base and the opaque portion of the cover are, according to the invention, made of material having significant thermal conductivity, such as aluminum. The housing, therefore, can be said to be a generally bowl-shaped (not necessarily round) or bulbous opaque structure partially covered by the opaque portion 11e-2 of the cover, leaving an opening where the transparent cover component 11e-1 is located. In a typical embodiment, and as shown in FIG. 2, the opening is generally semicircular, and oriented so as to be generally located in the lower half of the base, when the base is mounted on a vehicle, creating a generally semicircular opaque portion 11e-2 directly above transparent cover component.

The LED light source 11a is typically a so-called high-power LED (HPLED) provided as a surface-mount device (SMD). SMDs are LEDs which are surface mounted to a printed circuit board (PCB) substrate, as opposed to through-hole type LEDs which are mounted through the PCB substrate. Some well-known HPLEDs are the Lumileds Rebel LED, available from Philips Lumileds Lighting Company of San Jose, Calif., the Golden Dragon LED, available from OSRAM Opto Semiconductors GmbH, of Germany, and distributed in North America by Digikey of Minnesota, and the X-lamp LED, available from Cree LED Lighting Solutions, of Morrisville, N.C., all of which are suitable for use with the present invention. High power LEDs from Philips Lumileds Lighting Company are affixed or mounted on 21 mm star-shaped base metal core PCBs. The base metal core PCBs to which the surface-mounted LEDs are themselves affixed or mounted have several functions, one of which is to distribute heat developed by the LED surface-mounted device (i.e. the LED "chip").

As used here, the term "LED light source" or just "LED" is intended to convey the entire LED assembly, including any base metal core PCB to which the LED chip may be affixed.

The LED light source 11a is mechanically affixed to the housing so as to maximize heat transfer to the housing, using an LED thermal interface 11f including in some embodiments thermal tape, or thermal epoxy, or thermally conductive (typically metal) fasteners (e.g. screws), for ensuring good heat transfer from the LED light source to the housing.

The driver circuit 11b is attached to the opaque portion 11e-2 of the cover 11e (FIG. 3) using a driver circuit thermal interface 11c intended to maximize the transfer of heat from the driver circuit to the opaque portion of the cover, including, e.g. thermal tape (placed on the side of the printed circuit board opposite to that hosting the components of the driver circuit, i.e. the side of the printed circuit board shown in FIG. 2), thermal epoxy, thermally conductive fasteners (typically metal screws), and the like. This arrangement, then, ensures good heat transfer from the printed circuit board on which the driver circuit is mounted to the opaque portion of the cover, proximate to the transparent component of the cover. Lastly, in order to provide good heat flow to the (generally cooler) transparent component of the cover from the opaque portion, the two are mated using (typically watertight) thermally conductive (typically) removable gasket, serving as the opaque-transparent thermal interface 11e-3 (FIG. 1).

According to the invention, and as shown in FIGS. 2 and 3, the driver circuit 11b is attached to the opaque portion 11e-2 of the cover 11e located above the transparent component 11e-1, and as close as possible to the transparent component (i.e. the transparent portion of the cover). Thus, the heat conducted from the driver to the opaque portion of the cover is, to the greatest extent possible, conducted to the transparent cover component, rather than being lost to convection and radiation (as the heat conducts from the driver to the transparent cover component through the non-transparent portion of the cover). The LED, on the other hand, cannot, typically, be located so as to maximize heat transfer to the transparent cover component, since the LED must be positioned in order to provide a proper headlamp beam. (The LED must be positioned relative to any optics, e.g. relative to a reflector 11g (FIG. 2) or relative to the transparent cover component if the transparent cover component is a lens.)

Advantageously, and as shown in FIGS. 2 and 3, the driver circuit 11b is fastened to the opaque portion 11e-2 of the cover 11e above and proximate to the transparent cover component 11e-1, heating the opaque portion above the transparent cover component and also heating the transparent cover component by thermal conduction of heat through the opaque (non-transparent) portion of the cover. With this arrangement, besides helping to melt ice and/or snow on the transparent cover component directly, ice and/or snow on the opaque portion of the cover is melted just above the transparent cover component, creating a flowing liquid that further helps de-ice the transparent cover component.

In the view shown in FIG. 2, the driver circuit 11b is mounted on a printed circuit board, which is then attached to the opaque portion 11e-2 of the cover 11e. In other embodiments, the driver circuit (i.e. each individual component of the driver circuit) is mounted directly to the inside face of the opaque portion of the cover, immediately adjacent the opening for the transparent cover component. In such embodiments, the mechanism for mounting, which may be mechanical or via an adhesive, is provided so as to optimize the flow of heat from the driver circuit (components) to the opaque portion of the cover.

In some embodiments of the invention, the driver circuit 11b is provided with a temperature sensor 14 (FIG. 3), and programmed to operate inefficiently at temperatures lower than that at which water freezes (at e.g. standard temperature and pressure) (or some constant temperature close to the freezing temperature), thereby generating more heat than such a circuit ordinarily would generate. This could be done, for example, by switching on and off in a duty cycle more rapidly than is necessary.

In some other embodiments, instead of operating the (entire) driver circuit inefficiently, a precursor driver circuit could be included in the driver circuit, and used for generating heat using power from a power source (not shown), and then providing the remaining power to a main driver circuit, used to regulate current to the LED light source 11a. In such an embodiment, the precursor driver circuit would again include a temperature sensor 14 and would be programmed to operate only in case of a sensed temperature below a predetermined threshold temperature (such as the freezing point of water at standard temperature and pressure). A processor 12 (FIG. 3) may also be included as a component of the driver circuit 11b and programmed to cycle the power on and off when the temperature sensor 14 senses a temperature below a predetermined threshold.

In some embodiments, the cover 11e of the housing 11d is provided without an opaque portion, in which case the driver circuit 11d is attached to the housing 11d as close as possible to the cover 11e.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A headlamp for a vehicle, comprising:
   a housing including a generally concave base and a cover, the cover including an opaque portion and a light transmissive portion, the base and cover together defining an interior space;
   a light-emitting diode disposed within the interior space; and
   a driver circuit, for regulating current to the light-emitting diode, mechanically coupled to the housing proximate to the light transmissive portion and within the interior space, using coupling materials selected for having good thermal conductivity.

2. A headlamp as in claim 1, wherein the driver circuit is mechanically coupled to the opaque portion of the cover.

3. A headlamp as in claim 1, wherein the light transmissive portion of the cover is generally semicircular and is oriented so that it is generally located in the lower half of the base when the headlamp is mounted to the vehicle, and the driver circuit is mechanically coupled to the opaque portion above and proximate to the generally semicircular opening.

4. A headlamp as in claim 1, wherein the driver circuit is provided with a temperature sensor producing a signal indicative of a sensed temperature, and is programmed to operate inefficiently at temperatures lower than a predetermined temperature, thereby generating more heat than such a circuit ordinarily would generate when the sensed temperature is below the predetermined temperature.

5. A headlamp as in claim 4, wherein to enable inefficient operation when the sensed temperature is below the predetermined temperature, the driver circuit switches power to the light source on and off in a duty cycle more rapidly than is necessary merely to provide a satisfactory regulated current.

\* \* \* \* \*